2 Sheets--Sheet 1.
W. D. BROOKS.
Soldering-Machines.
No. 139,763.　　　　　　Patented June 10, 1873.
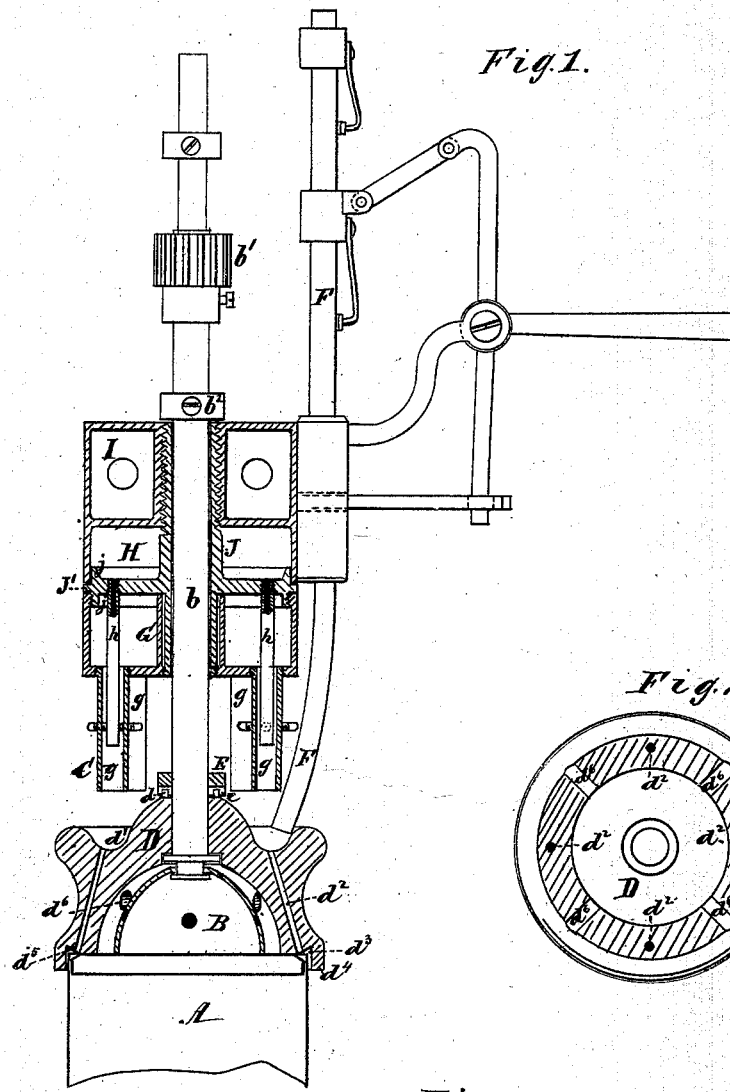
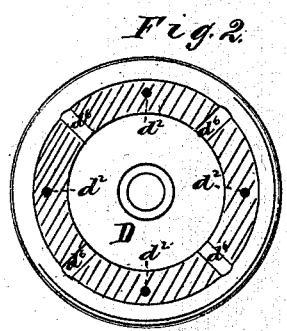
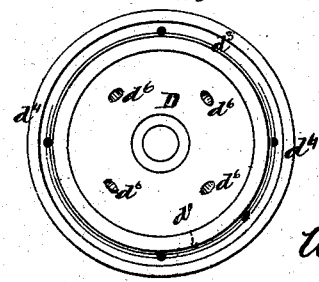
Witnesses:
G. Mathys
Solon C. Kemon
Inventor:
William D. Brooks
Per
Attorneys.

W. D. BROOKS.
Soldering-Machines.
No. 139,763.
2 Sheets--Sheet 2.
Patented June 10, 1873.
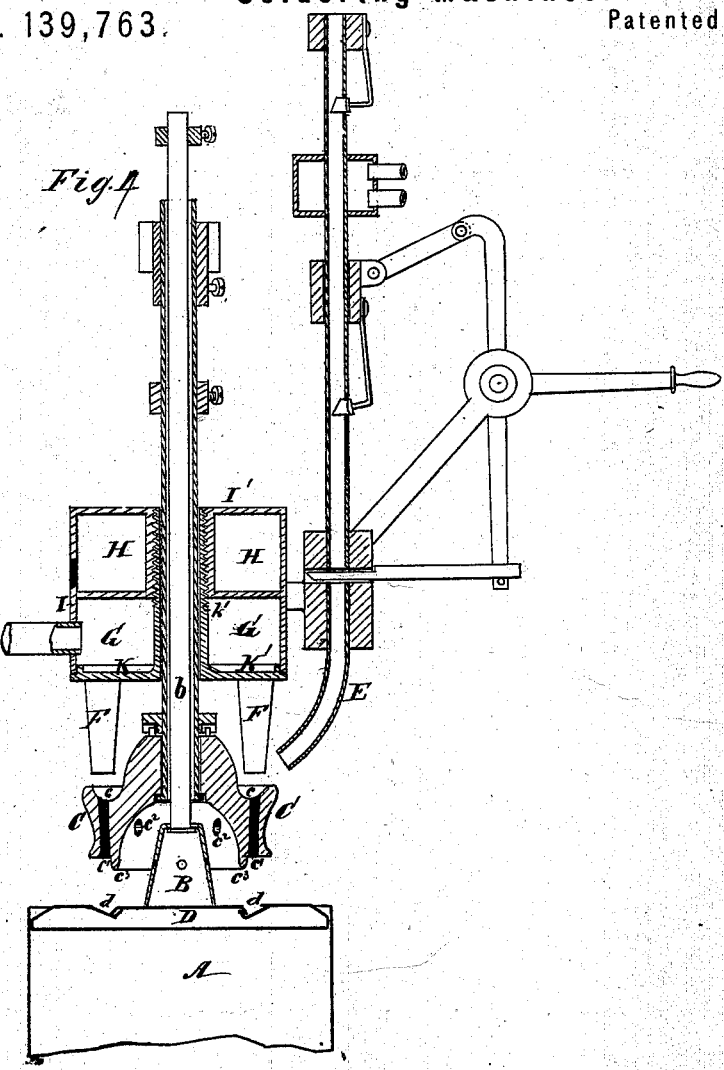
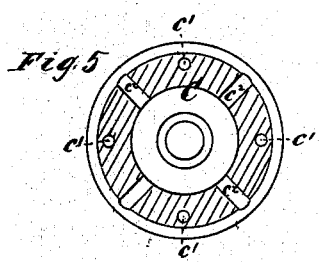
Witnesses:
Solon C. Kemon
Inventor:
William D. Brooks
Per
Attorneys.

UNITED STATES PATENT OFFICE.

WILLIAM D. BROOKS, OF BALTIMORE, MARYLAND, ASSIGNOR TO MARY C. BROOKS AND GEORGE D. BROOKS, OF SAME PLACE.

IMPROVEMENT IN SOLDERING-MACHINES.

Specification forming part of Letters Patent No. 139,763, dated June 10, 1873; application filed May 20, 1873.

*To all whom it may concern:*

Be it known that I, WILLIAM D. BROOKS, of Baltimore city and State of Maryland, have invented a new and Improved Soldering Apparatus; and I do hereby declare the following to be a full, clear, and exact description of the same, reference being had to the accompanying drawing forming part of this specification.

The invention relates to means whereby the intense heat of the blow-pipes is prevented from coming into close proximity with the can by an intermediate rotary soldering-tool; also, peculiarities of construction in the soldering-tool; and also to a novel mode of constructing the bolt which couples together the sections which embrace the water, gas, and air chambers, all as hereinafter described and pointed out in the claim. The invention also relates to a novel mode of constructing a rotary tool, intended to solder a cap to the body of a can without wasting the solder and smearing it on cap or head. It also relates to a method of constructing and putting together the gas and air chambers, so that they can be readily separated in order to substitute larger or smaller burners.

In the drawings, Figures 1 of each sheet of drawing are vertical sectional elevations; Figs. 2 and 3, horizontal sections of the soldering-iron.

In sheet 1 of drawings, A represents a can placed in position to have a head soldered to the body. B is the cap-holder, attached to its lift-tube $b$; and C is the circle of burners or blow-pipes that heat and liquefy the solder. D is a soldering-tool, placed loosely on the lift-tube $b$, and keyed to the tube by a pin, $d$, that plays in a slot, $e$, of the fast collar E. By this mode of attaching the soldering-tool to the lifter-tube $b$, which is rotated by a pinion, $b^1$, the tool has end play enough to enable it to adjust itself to the top of the can, while it is also compelled to rotate with the tube $b$. The soldering-tool D has an annular trough, $d^1$, connected by perforations $d^2$ with the recess $d^3$, through which the melted solder passes into the seam between the top edge of body and head. The shape of the recess $d^3$ is of the greatest importance, and is formed by the inner vertical face of flange $d^4$, and an oblique face, $d^5$. By this construction the fluid solder will not follow the upwardly-obliqued face $d^5$, and be wasted on the outside, but will go straight down into the seam, while the circumjacent lip $d^4$ embraces the edge of can, and shuts out such an inpouring of air as would tend to cool and stiffen the solder before it had been properly distributed. By interposing the tool D between the blow-pipes and the can, the intense heat is less liable to injure the can-metal. $d^6$ is a series of holes that admit air to the inner surface of can-top. This air is heated and passes out of the tube $b$. F is the tube in which the wire-solder is cut off, and through which the bits are dropped into the trough $d^1$. G is the gas and H the air-chambers, with their respective pipes $g$ $h$. I is the water-chamber, and J the bolt by which they are attached together. This bolt has the plate J' provided near its edge with two opposite flanges, $j$ $j$, on the lower one of which screws the gas-chamber G, while against the upper, and in the recess formed with the outer edge of plate J', is fitted snugly the circular edge of the air-chamber, which is in the same piece with the water-chamber. The latter two chambers are held by the screw-connection of the bolt with the center of water-chamber. A collar, $b^2$, serves to prevent the weight of soldering-tool and connections from coming upon the can, and thus interfering with the rotation of the tool.

The operation of the machine is as follows: The cans are brought up under the soldering apparatus, when the cap-holder B first comes down and holds the cap and top in place while the soldering-tool D is revolved. The wire is cut off in tube F, and dropped in trough $d^1$, in which it is instantaneously melted by the intense heat of the blow-pipe. The fluid now passes down through perforations $d^2$, and flows down into the seam which, in practice, is first fluxed with resin or equivalent. The soldering-tool is then raised, a full draft of air admitted, and the solder allowed to set before the holder B is removed.

In sheet 2 of the drawing, A is the can; B, the cap-holder, having lift-tube $b$; and C, the soldering-tool, having trough $c$, perforations $c^1$ $c^2$, and inner projecting flange $c^3$.

This soldering-tool is especially adapted and intended for putting on the cap D of a can, on each of which a channel, $d$, is formed, as shown in Fig. 1 of the drawing. Into this channel $d$, and against the inner side thereof, passes the inner flange $c^3$ of the soldering-tool. As the bits of solder are cut in and discharged from the bent tube E, they are melted by the blow-pipes F in the trough $c$, from whence they pass through the perforations into the channels $d$ of can.

By this construction there is no danger, or indeed any possibility, of the liquid-solder becoming smeared on the head of can or on the cap itself.

G is the gas and H the air-chamber formed in two pieces, I I' and K K'. The tube K' is threaded, and works in a thread, I', of piece I. This construction is extremely simple, and allows the circles of different-sized burners to be changed with facility.

Having thus described my invention, what I claim as new, and desire to secure by Letters Patent, is—

1. A soldering-tool having the pin $d$ and loosely surrounding the revolving tube $b$, combined, as described, with a fast collar, E, having the slot $e$, to enable the said tool to have end play and yet to revolve with the tube.

2. The combination, with one or more blow-pipe burners, C, of a rotary soldering-tool having trough $d^1$ and perforations $d^2$, as and for the purpose set forth.

3. The flange $d^4$, applied to the bottom edge of a soldering-tool to prevent the ingress of too much air before the melted solder has been properly distributed.

4. A soldering-tool having the oblique face $d^5$ in connection with the perforations $d^2$, as and for the purpose set forth.

5. The bolt J, having a disk, J', with flanges $j$ $j$ that enable the sections to be coupled together in the manner described.

6. A soldering-tool, C $c$ $c^1$, having the inner flange $c^3$, and applicable in the manner and for the purpose described.

7. The gas and air chambers G H, formed in two parts I I' and K K', as and for the purpose set forth.

To the above specification of my invention I have signed my hand this 15th day of May, A. D. 1873.

WM. D. BROOKS.

Witnesses:
SOLON C. KEMON,
T. D. DURBIN OURAND.